J. A. KOLBY, L. P. LARSEN & C. P. NEILSEN.
AUTOMOBILE WHEEL.
APPLICATION FILED MAY 28, 1913.
1,081,237.
Patented Dec. 9, 1913.
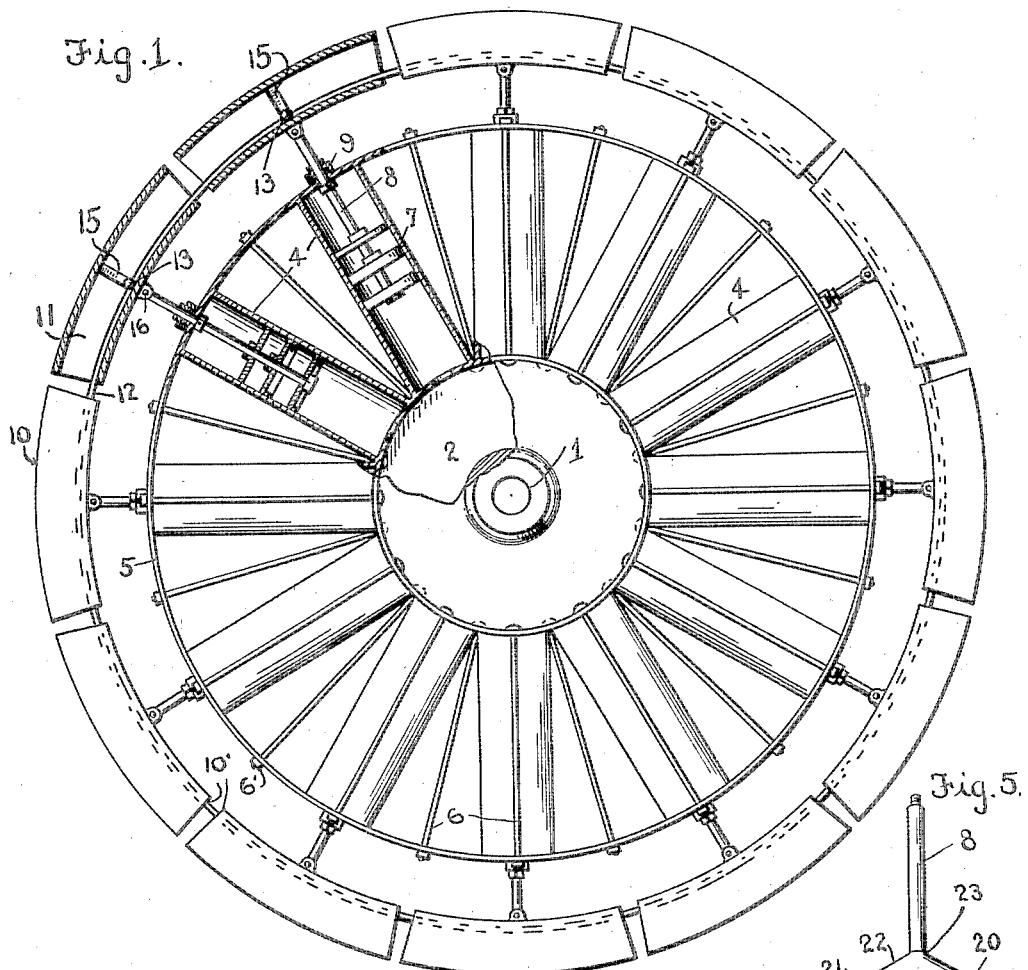
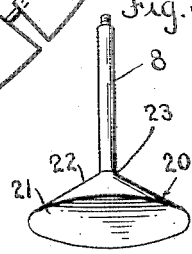
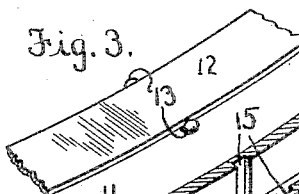
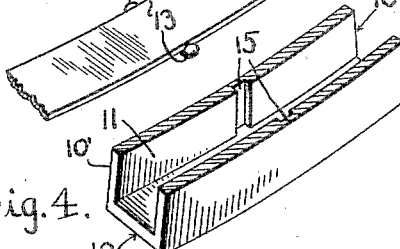
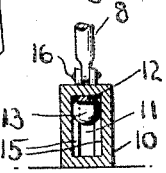
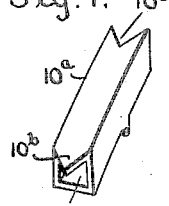
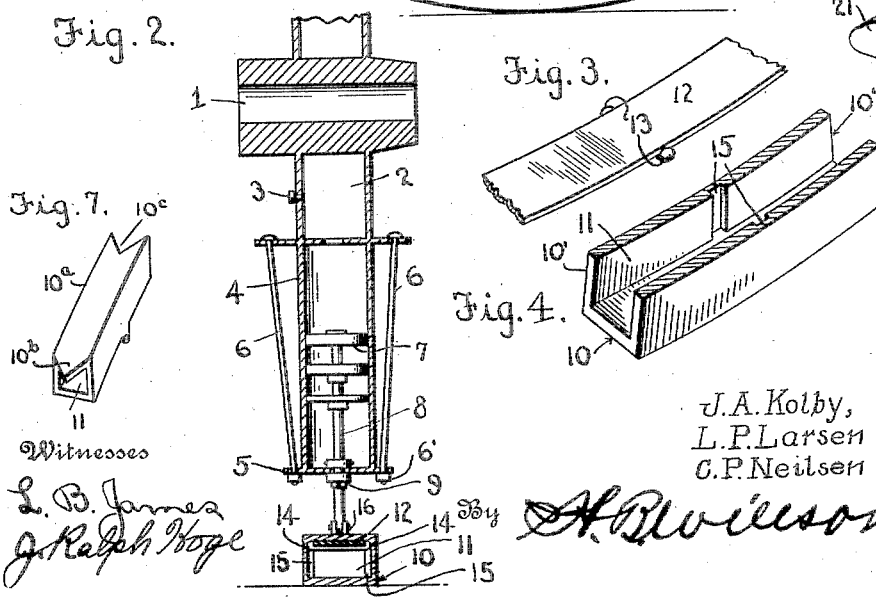
Inventors
J. A. Kolby,
L. P. Larsen &
C. P. Neilsen
Attorneys

UNITED STATES PATENT OFFICE.

JAMES A. KOLBY, LOUIS P. LARSEN, AND CHRISTIAN P. NEILSEN, OF EPHRAIM, UTAH.

AUTOMOBILE-WHEEL.

1,081,237.　　　　　Specification of Letters Patent.　　Patented Dec. 9, 1913.

Application filed May 28, 1913.　Serial No. 770,395.

*To all whom it may concern:*

Be it known that we, JAMES A. KOLBY, LOUIS P. LARSEN, and CHRISTIAN P. NEILSEN, citizens of the United States, residing at Ephraim, in the county of Sanpete and State of Utah, have invented certain new and useful Improvements in Automobile-Wheels; and we do declare the following to be a full, clear, and exact description of the invention, such as will enable others skilled in the art to which it appertains to make and use the same.

This invention relates to resilient wheels, and more especially to those in which the hub has radial cylinders and the rim is made in sections mounted on rods which are carried by a piston moving in said cylinder; and the object of the same is to improve a wheel of this construction.

To this end the invention consists in the details hereinafter more fully set forth and claimed, and as shown in the drawings wherein—

Figure 1 is a side elevation of this wheel complete, partly in section. Fig. 2 is a transverse section through one spoke and the hub. Figs. 3 and 4 are perspective details respectively of a portion of the heavy ring and a segmental section of rim with the inner side removed. Fig. 5 is a perspective detail of a modified form of shoe. Fig. 6 is a sectional detail of a slight modification adapting the device for a narrower ring. Fig. 7 is a perspective detail of a slight modification in the shape of the rim sections.

The hub of this improved wheel consists of a central tube 1 adapted to be mounted fast on the end of an axle-section if this be one of the drive wheels, or to be mounted rotatably on the stub at one end of the front axle; and around said tube is an annular air chamber 2 having a proper nipple and valve 3 by means of which it may be pumped up. Carried by and projecting radially from the outer wall of this chamber are cylinders 4, and around the outer ends of said cylinders is a band 5, the latter being additionally connected with the outer wall of the chamber 2 by spokes 6 as of wire. Within each cylinder works a piston 7 carried at the inner end of a piston rod 8 passing through a hole in the band and having suitable packing 9 around said hole as shown. Thus it will be seen that the spaces inside the several pistons communicate with the air chamber and therefore with each other, whereas the spaces outside these pistons are independent of each other. The rim of this wheel is by preference made in sections as shown in Figs. 1, 3, and 4. Each section is segmental as shown at 10 and has a longitudinal opening 11 throughout it, and a heavy metal ring 12 extends around the rim and throughout the length of all the sections, the ring having knobs 13 (or perhaps transverse extensions as seen at 14 in Fig. 2) which work in grooves 15 within the several sections 10. Each of the latter is pivotally connected as at 16 with the outer end of one of the piston rods 8. When now pressure is applied to any section, the latter moves straight inward toward the center of the hub and its grooves slide along the knob or extension on the ring 12. As it moves in this direction it pushes on the rod 8 and causes the piston to move inward so that the air within the chamber and in the inner ends of all other cylinders is compressed, whereas the air in the outer end of this cylinder is expanded. The cushion effect thus produced is the combined result of compression of air on one side of the piston and the expansion of air on the other.

In the modification illustrated in Fig. 5 each section of the rim is made of a solid member 20 which is convex on its outer face as at 21 and preferably round in plan view, its inner end being formed in the shape of a cone as at 22, and united with or connected to the outer end of the piston rod 8 at the point 23. The piston and piston rod in this case are round, and so also is the member 20, with the result that the latter may rotate in addition to its movement inward and outward as described with reference to each section of the rim above. This modification avoids the necessity for a surrounding ring 12, and is therefore cheaper to make.

The invention is not to be confined strictly to the details above described, as changes therein may be made and elaborations added without departing from the principle.

In either construction of this wheel it will be obvious that the wire spokes brace the band 5 so as to hold it always concentric with the hub, and in order to give the wheel lateral rigidity these spokes extend from the end of the hub and preferably converge toward each other as seen in Fig. 2. Means may be provided for tightening the spokes, as herein indicated by the nuts 6' at their outer ends. While the spokes are shown as of wire, it is clear they might be of other material without departing from the spirit of this invention. It will be observed that the ends of the segment-shaped rim-sections 10 are cut off on inwardly diverging lines as shown at 10'. This is for the purpose of permitting one section to move inward irrespective of those on either side, or for permitting two sections to move inward simultaneously in case they pass over an obstruction which actuates both to a greater extent than their pivots permit them to tilt. With the construction shown in Fig. 5 these pivots at 16 are not necessary—hence the rigid juncture 23 at this point. The edges of the solid members 20 in this construction are preferably sharp so that one rim-section may move inward irrespective of those on either side of it, or that two rim-sections may move inward simultaneously in which case one edge would pass over or under that of the next. With the construction of rim-sections shown in Fig. 7, the tread face 10$^a$ of each section is flat as shown at 10 in Fig. 4, but one end is provided with a point 10$^b$ and the other end with a notch 10$^c$ so that the tread faces of contiguous sections will overlap to an extent and there is never a time when at least two of said faces do not lie on the ground. While we have shown the interlapping extremities as pointed and notched, the projection on one section might have another shape provided the recess on the contiguous section was shaped to correspond, and therefore we do not wish to be limited strictly to the shape shown in Fig. 7.

What is claimed as new is:

1. A spring wheel comprising a hub having an annular air chamber, a series of cylinders projecting radially from the hub and with their inner ends communicating with said chamber, a band around the outer ends of said cylinders and pierced with openings opposite them, a piston in each cylinder, a piston rod passing through said opening, packing in the latter around the rod, a rim made up of hollow segmental sections whereof each is pivoted at its mid-length to the outer end of a rod and has internal radial grooves at its sides and opposite the pivot point, and a ring passing through all said sections and having enlargements movably mounted in said grooves.

2. In a spring wheel, the combination with a hub, a series of cylinders radiating therefrom, a band connecting the outer ends of the cylinders, pistons in the latter, and rods leading from the pistons radially outward through said band; of a rim made up of hollow segmental sections whereof each is pivoted at its mid-length to the outer end of a rod and has internal radial grooves at its sides opposite the pivot point, and a ring passing through all said sections and having enlargements movably mounted in said grooves.

3. A spring wheel comprising a hub having an annular air chamber, a series of cylinders projecting radially from the hub and with their inner ends communicating with said chamber, a piston in each cylinder, a piston rod therefor, a rim made up of hollow segmental sections whereof each is pivoted at its mid-length to the outer end of a rod and has internal radial grooves at its sides opposite the pivot, and a ring passing through all said sections and having enlargements movably mounted in said grooves.

In testimony whereof we have hereunto set our hands in presence of two subscribing witnesses.

JAMES A. KOLBY.
LOUIS P. LARSEN.
CHRISTIAN P. NEILSEN.

Witnesses:
EDWARD P. THOMANDER,
LAURITZ NIELSEN.